United States Patent
Tai

(10) Patent No.: US 7,681,822 B2
(45) Date of Patent: Mar. 23, 2010

(54) POSITIONING STRUCTURE OF A SINGLE-PULL REEL

(75) Inventor: Ting-Kuo Tai, Taipei (TW)

(73) Assignee: Acrox Technologies Co., Ltd., Taipei (TW)

( * ) Notice: Subject to any disclaimer, the term of this patent is extended or adjusted under 35 U.S.C. 154(b) by 0 days.

(21) Appl. No.: 12/399,994

(22) Filed: Mar. 9, 2009

(65) Prior Publication Data

US 2009/0159733 A1   Jun. 25, 2009

Related U.S. Application Data

(63) Continuation-in-part of application No. 11/846,535, filed on Aug. 29, 2007, now abandoned.

(51) Int. Cl.
*B65H 75/48* (2006.01)
(52) U.S. Cl. .............. 242/378.1; 242/378.2; 242/378.3; 242/378.4
(58) Field of Classification Search .............. 242/378.1, 242/378.4, 378, 378.2, 378.3
See application file for complete search history.

(56) References Cited

U.S. PATENT DOCUMENTS

| | | | | |
|---|---|---|---|---|
| 6,736,346 | B1 * | 5/2004 | Park | 242/378.1 |
| 7,523,883 | B2 * | 4/2009 | Cheng | 242/378 |
| 2009/0101743 | A1 * | 4/2009 | Chang | 242/385.2 |
| 2009/0166462 | A1 * | 7/2009 | Chang | 242/375 |

* cited by examiner

*Primary Examiner*—Sang Kim
(74) *Attorney, Agent, or Firm*—Leong C. Lei

(57) ABSTRACT

A single-pull reel which includes an upper cover, a bottom cover configured to engage with the upper cover, a cord-rotating disc, a clamping member provided on a top section of the cord-rotating disc, the bottom portion of the cord-rotating disc being provided with a sliding groove, a spiral spring having an inner end and an outer end, the inner end being engaged with the notch of the axle of the upper cover, a cord divided into a first section and a second section, a positioning ball mounted within the sliding groove of the cord-rotating disc thereby forming an engaged sliding movement, and the bottom cover having an inner face provided with a multifunctional rail in combination with the positioning ball to provide a clockwise and counterclockwise movement of the cord-rotating disc thereby causing the positioning ball to provide alternately a loosening and tightening operation of the cord.

1 Claim, 5 Drawing Sheets

POSITIONING STRUCTURE OF A SINGLE-PULL REEL

CROSS-REFERENCE TO RELATED APPLICATION

This is a continuation-in-part of the patent application Ser. No. 11/846,535, filed Aug. 29, 2007 (abandoned).

BACKGROUND OF THE INVENTION (a) Technical Field of the Invention

The present invention relates to an improvement in the positioning structure of a single-pull reel, and in particular to a positioning structure which is durable in use, easy to operate and accurate in positioning and reduces noise in operation.

(b) Description of the Prior Art

Conventional type of positioning a cord within a reel is the application of a steel bead. As shown in FIGS. 6 and 7, the reel A10 comprises a front cover A1, a spiral spring A2, a sliding seat A3, a transmission cord A4, a positioning steel bead A5 and a rear cover A6. In this conventional structure, the sliding seat A3 contains the spiral spring to restore the transmission cord A4 to its original position. The steel bead A5 slides within the sliding seat A3 so as to position the cord A4. The bottom section of the sliding seat A3 has a passage A31 so that the steel bead A5 could roll, engage and disengage within the passage A31. Thus when the sliding seat A3 is pulled at a high speed and high speed retraction, the steel bead passage A31 will also in operation. Under this condition, the steel bead passage A31 under a high speed rotation, does not comply the requirements of stable engaging and sliding, thus extreme gap and error are formed. Relatively, design on rail is difficult and high precision is needed. Thus the cost of producing the rail is high. In addition, when there is a friction and the error on the gap is too large, the dislocation of the steel bead A5 is expected and thus, the function of positioning is lost. As a result, frequent dislocation of cord in the reel occurs and the longevity is lost.

SUMMARY OF THE INVENTION

It is the primary object of the present invention to provide a single-pull reel which includes an upper cover, a bottom cover configured to engage with the upper cover, a cord-rotating disc, a clamping member provided on a top section of the cord-rotating disc, the bottom portion of the cord-rotating disc being provided with a sliding groove, a spiral spring having an inner end and an outer end, the inner end being engaged with the notch of the axle of the upper cover, a cord divided into a first section and a second section, a positioning ball mounted within the sliding groove of the cord-rotating disc thereby forming an engaged sliding movement, and the bottom cover having an inner face provided with a multi-functional rail in combination with the positioning ball to provide a clockwise and counterclockwise movement of the cord-rotating disc thereby causing the positioning ball to provide alternately a loosening and tightening operation of the cord.

Yet another object of the present invention is to provide an improved positioning structure for a reel, wherein the multi-functional rail is provided at the inner edge face of the outer cover and is fixed, avoiding the generation of noise as a result of the gap.

Still yet another object of the present invention is to provide an improved positioning structure for a reel, wherein the positioning steel ball mounted at the edge face of the reeling disc will reduce the frictional force generated by the edge face of the reeling face, thus the stress on the spiral spring is reduced.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
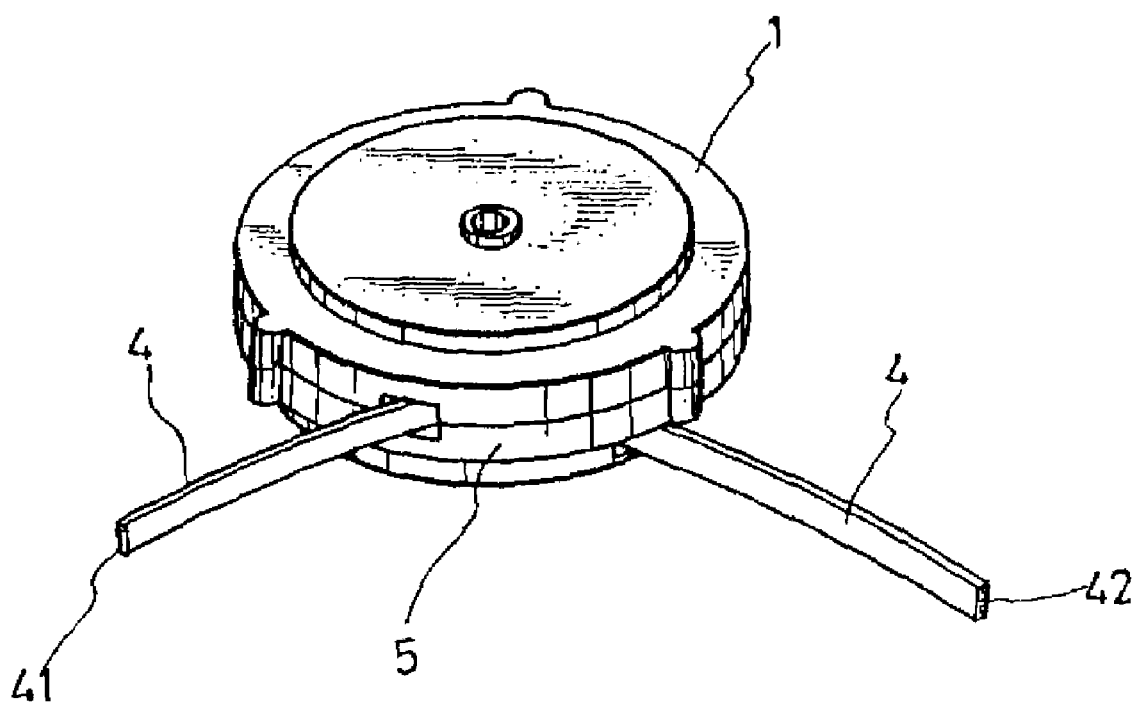
FIG. 1 is a perspective view of a preferred embodiment in accordance with a preferred embodiment of the present invention.
Figure 2:
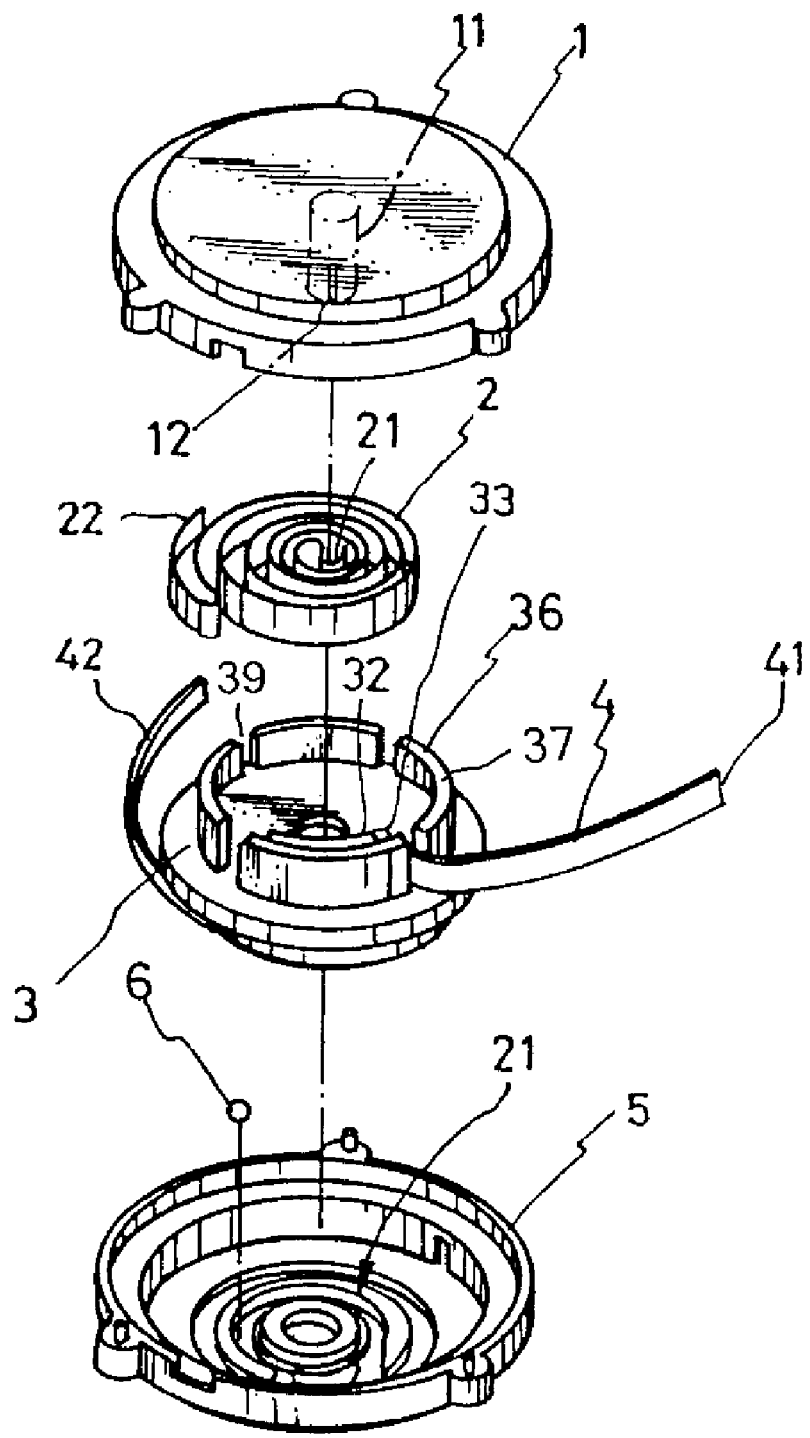
FIG. 2 is an exploded perspective view showing the parts of the preferred embodiment of the present invention.
Figure 3:
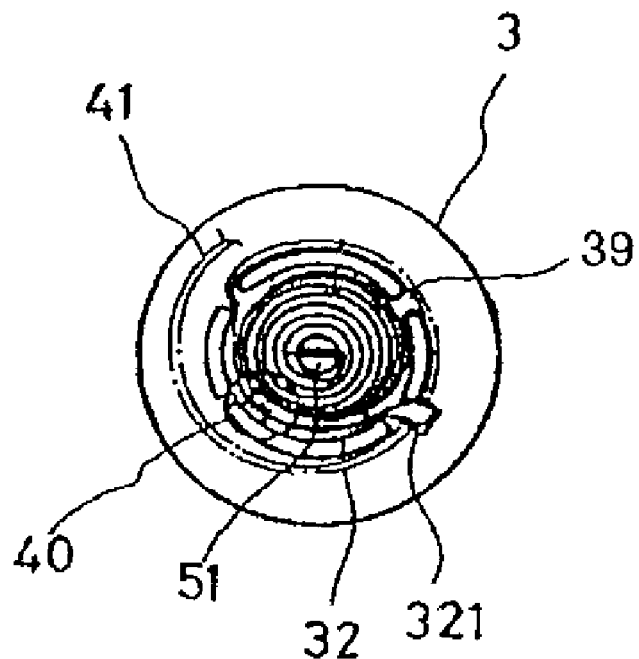
FIG. 3 illustrates the engagement of the spiral spring and the cord-rotating disc.
Figure 4:
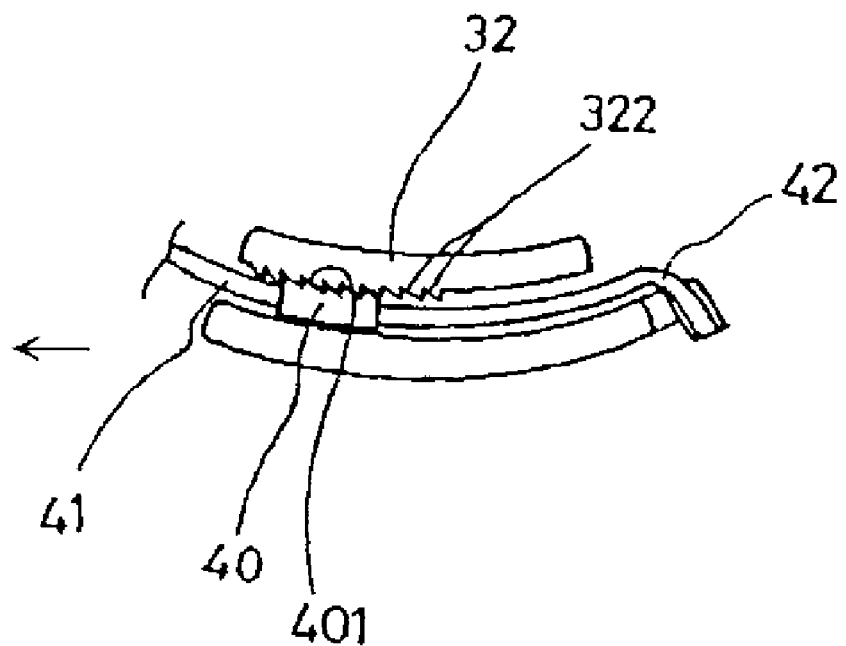
FIG. 4 is an enlarged view of a portion of FIG. 3.
Figure 5:
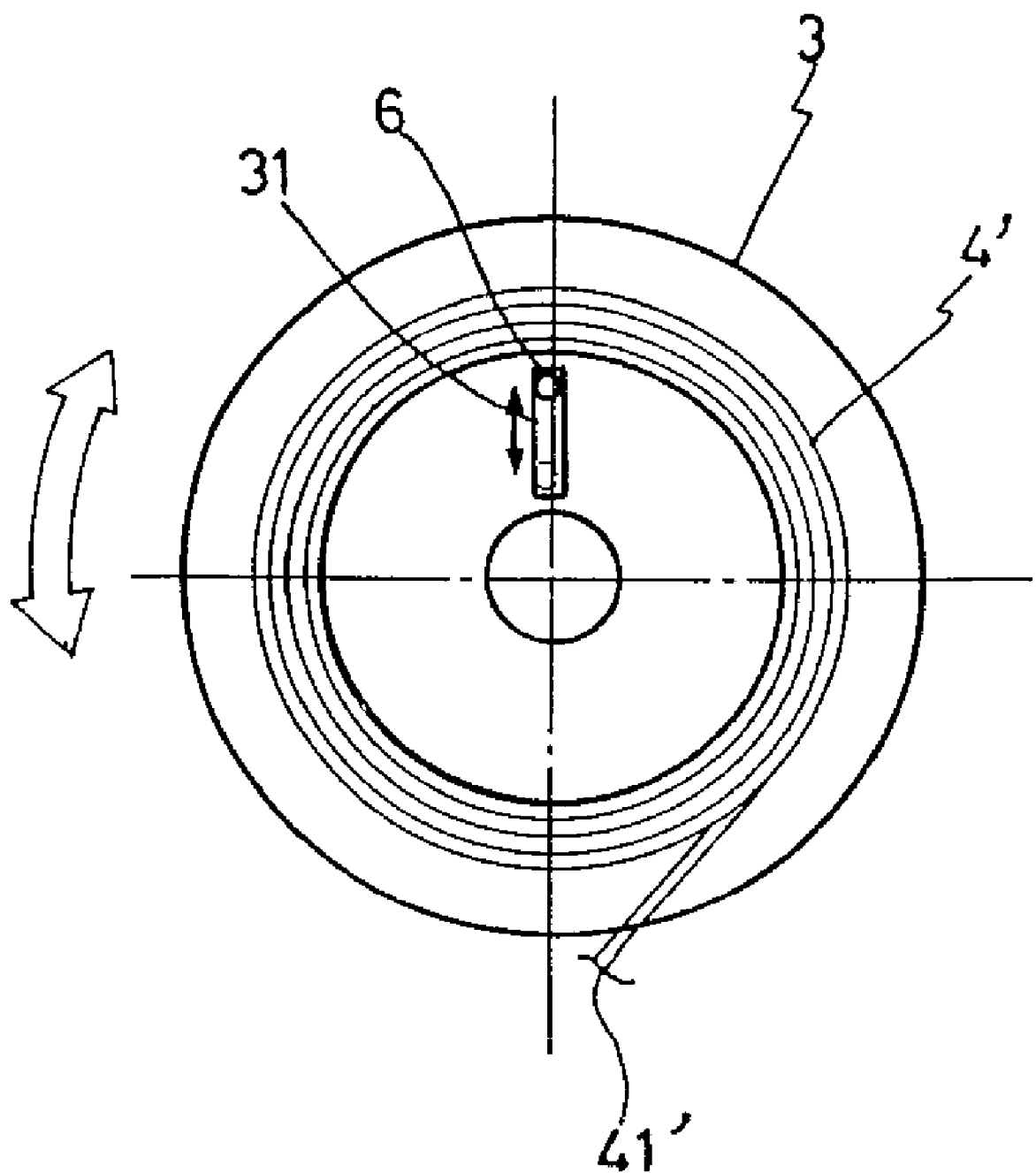
FIG. 5 is a schematic view showing the bottom structure of the cord-rotating disc.

Referring to FIGS. 1, 2, 3 and 4, the single-pull reel according to the present invention generally comprises a top cover 1, a spiral spring 2, a cord-rotating disc 3, a cord 4, a bottom cover 5, and a positioning ball 6. The top cover 1 is provided at the center with a downwardly extending axle 11 which has a notch 12 at the lower end. The bottom cover 5 is configured to engage with the top cover 1. The inner end of 21 the spiral spring 2 is in engagement with the notch 12 of the axle 11 within the interior of the top cover 1. The cord-rotating disc 3 has an upper portion, a lower portion and a center hole. The cord-rotating disc 3 is provided at the top portion with a circular flange 36 which is divided into a plurality of sections 37 by a plurality of slots 39. A clamping member 32 is provided on the top portion of the cord-rotating disc 3 behind a section a section 37 to form a passage therebetween and has a plurality of serrated teeth 322 at the inner side against the section 37. The outer end of the spiral spring 2 is bent into a hook 22 to engage with one of the sections 37. When the cord-rotating disc 3 is rotated in clockwise or counter-clockwise direction, the spiral spring 2 will be tightened or loosened. The cord 4 is provided with an enlarged block 40 which divides the cord 4 into a first section 41 and a second section 42. The enlarged block 40 has a plurality of serrated teeth 401 engaged with the serrated teeth 322 of the clamping member 32, so that once the enlarged block 40 of the cord 4 is pushed to engage with the clamping member 32 in assembly, the enlarged block 40 cannot be pulled out of the clamping member 32. The first section 41 of the cord 4 is wound around the circular flange 36 of the cord-rotating disc 3. Referring to FIGS. 2 and 5, the second section 42 of the cord 4 extends out of the hole 33 of the cord-rotating disc 3 from the top portion to the bottom portion to connect with any desired connector (not shown).

In accordance with the present invention, the characteristics of the positioning structure are that a positioning ball 6 is provided to the inner side of the bottom cover 5 corresponding to the cord-rotating disc 3, wherein the inner side of the bottom cover 5 is provided with a multi-functional rail 21 in combination with the positioning ball 6 to provide a clockwise and counterclockwise movement of the cord-rotating disc 3 such that the positioning ball 6 provides alternately a loosening and tightening operation of cord.

Figure 6:
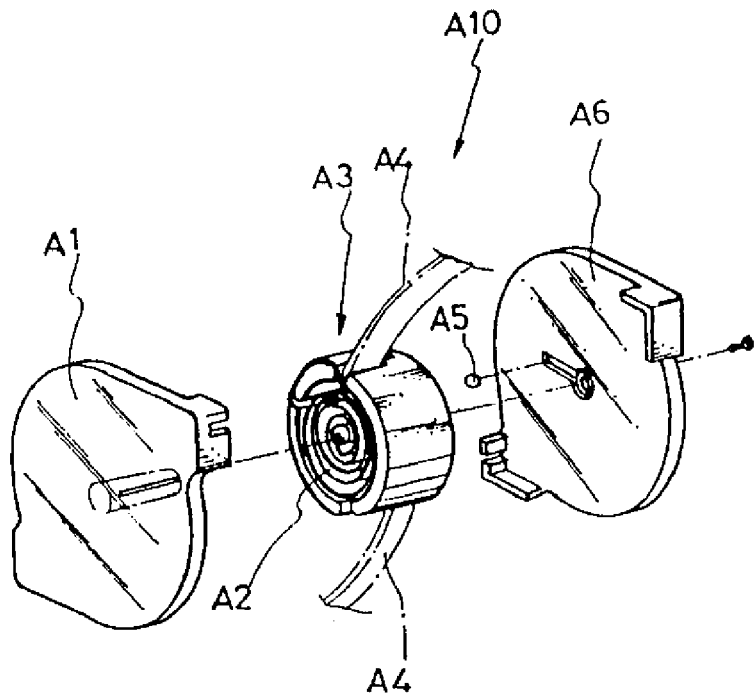
FIG. 6 is an exploded view showing the individual components of a conventional reel.
Figure 7:
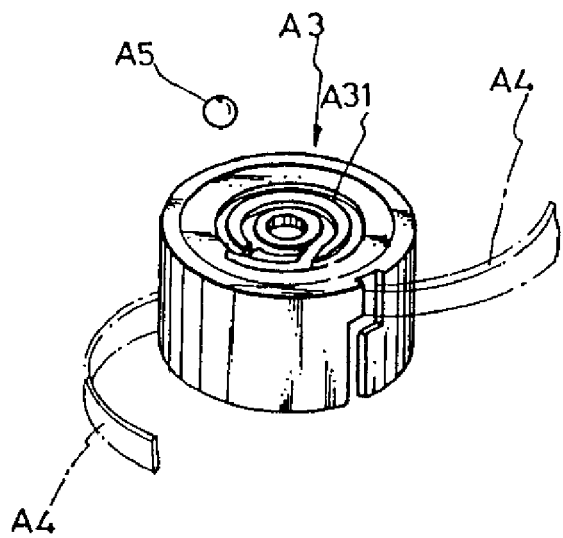
FIG. 7 is a schematic view of a conventional reel showing the bottom section of the sliding side.

As shown in FIG. 6, the positioning ball 6 is mounted within the sliding groove 31 on the bottom side of the cord-rotating disc 3 such that the positioning ball 6 forms into an engaged sliding movement.

In accordance with the present invention, the multifunctional rail 21 is secured and stable, this will mitigate the drawback of the conventional steel bead following the movement of the sliding seat and the generation of noise.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A single-pull reel comprising:

an upper cover having a center provided with a downwardly extending axle, said axle having a lower end provided with a notch;

a bottom cover configured to engage with said upper cover;

a cord-rotating disc having a top portion, a bottom portion and a center hole, said top portion being provided with a circular flange which is divided into a plurality of sections by a plurality of slots, a clamping member being provided on said top section of said cord-rotating disc to form a passage between said clamping member and one of said sections and having engaging means at an inner side against said one of said sections, said bottom portion being provided with a sliding groove;

a spiral spring having an inner end and an outer end, said inner end being engaged with said notch of said axle of said upper cover, said outer end being bent into a hook to engage with one of said sections of said cord-rotating disc;

a cord divided into a first section and a second section by an enlarged block, said block having an engaging means engaged with said engaging means of said clamping member, said first section of said cord being wound around said first flange of said cord-rotating disc, said second section of said cord extending out of a hole from said top portion of said cord-rotating disc to said bottom portion of said cord-rotating disc;

a positioning ball mounted within said sliding groove of said cord-rotating disc thereby forming an engaged sliding movement; and said bottom cover having an inner face provided with a multi-functional rail in combination with said positioning ball to provide a clockwise and counterclockwise movement of said cord-rotating disc thereby causing said positioning ball to provide alternately a loosening and tightening operation of said cord.

* * * * *